United States Patent Office 3,218,224
Patented Nov. 16, 1965

3,218,224
LAMINATES OF OLEFIN POLYMER FILMS
Charles W. Osborn, Bartlesville, Okla., assignor to Phillips Petroleum Company, a corporation of Delaware
No Drawing. Filed Dec. 4, 1961, Ser. No. 157,012
5 Claims. (Cl. 161—247)

This invention relates to laminates of films formed from olefin polymers. In another aspect it relates to bags formed from such laminates.

Bags formed from films of polyethylene, polypropylene or ethylene polymers such as copolymers of ethylene with higher mono-1-olefins are very desirable for packaging and storing foods because the very low moisture permeability of these films enables the food to retain its freshness over extended periods of time. One of the difficulties of using these materials for products such as sugar, flour and the like is that such films have had a tendency to tear and rupture easily upon impact. Such weaknesses can be overcome to some extent by increasing the thickness of the films used but this increases their weight and cost so that their competitive advantage with other packaging materials is substantially reduced. It is highly desirable therefore that films of ethylene polymers be developed having improved resistance to tear and greater impact strength.

I have now discovered that a film of a given thickness having improved tear resistance and impact strength can be made by laminating two or more plies of olefin polymer film having a density of at least about 0.940 provided that the films are bonded with flexible adhesive and that the films have been fabricated by extrusion and immediately quenching the film with a takeup rate sufficient to produce longitudinal orientation. I have also found that such laminates can be increased still further in their resistance to tear by placing the plies together in such a manner that their directions or orientation are rotated at least 10 degrees with respect to one another.

It is an object of my invention to provide an improved film of olefin polymer which can be used for forming bags for the packaging of foodstuffs. Another object of my invention is to provide an olefin polymer film having greater impact strength and resistance to tear. Still another object is to provide a laminated structure of ethylene polymer films which has been fabricated in such a way that the laminate has greater strength and tear resistance than a single ply of the same polymer. Other objects, advantages and features of my invention will be apparent to those skilled in the art from the following discussion.

Broadly the polymers which can be used in forming the laminates of this invention are the polyolefins, preferably those which are regarded as hightly crystalline, for example the high density ethylene polymers and isotactic polypropylene, polybutene, poly-4-methylpentene-1, and the like. The crystallinity of these polymers should be at least 70 percent and preferably at least 80 percent at 25 degrees centigrade, the crystallinity being measured by X-ray diffraction methods or by nuclear magnetic resonance. Prior to the determination of crystallinity it is desirable that the sample of polymer be treated for thermal equilibration in the manner described below in connection with density determination.

The plastic plies which are preferred in the laminates of my invention are formed from polyethylene or from ethylene polymers which have a density of at least about 0.940 gram per cubic centimeter. Usually the density of these materials is in the range of 0.940 to 0.980. The term "density," as used in the specification and in the claims, refers to the weight per unit volume (gram per cubic centimeter) of the ethylene polymer at 25 degrees centigrade. In the determination of the density the sample should be at thermal and phase equilibrium. In order to insure this, it is desirable to heat the sample to a temperature 15 to 25 centigrade degrees above its melting point and allow the sample to cool at a rate of about 2 centigrade degrees per minute to the temperature at which the density is to be measured. Any standard method for determining the density of a solid is acceptable. Polymers within this density range include polyethylene and copolymers of ethylene with propylene, 1-butene or higher mono-1-olefins having up to 8 carbon atoms per molecule. The amount of the monoolefin having 3 or more carbon atoms per molecule is limited by the density which is desired in the ultimate product. The density of the ethylene polymer tends to decrease as the amount and molecular weight of the comonomer increases.

Ordinarily the ethylene polymers used in this invention have a melt index in the range of about 0.5 to 25 and preferably about 1.5 to 10. The melt index is determined according to ASTM Method D–1238–52T. Very good results can be obtained with polymers having a melt index in the range of 3.5 to 10.

The films which are formed from the olefin polymers are made by extrusion followed by immediately quenching film while taking up the fabricated film at a rate sufficient to produce longitudinal orientation in the structure. This is preferably done by extruding the film through a slot die into a water bath. In making films of this type, particularly from ethylene polymers, the slot die should not be more than one-half inch from the surface of the quench bath and the temperature of the bath should be in the range of about 135 to 160 degrees Fahrenheit. It is preferred to operate with the quench bath at a temperature of about 140 to 155 degrees Fahrenheit and even more preferably 142 to 152 degrees Fahrenheit with the distance between the die face and the surface of the quench liquid not more than about one-fourth inch. The minimum distance in this respect is determined by the minimum distance which the quench liquid can be separated from the die without ebullition at the surface of the quench liquid.

The films produced by this method and used in the laminates of this invention have a thickness of at least 0.1 mil and may be as thick as 30 mils or more. Ordinarily the films will have a thickness of about 0.25 mils to 10 mils and I prefer to use films having a thickness of 0.5 mils to 5 mils. In preparing these films the takeup rate should be suffiicent to produce longitudinal orientation. This result is obtained when the rate of taking the film away from the quench bath is greater than the extrusion rate, resulting in a drawing down of the film from its extruded thickness to a final thickness. The ratio of the thickness of the film at the moment of extrusion to the thickness after stretching or drawing is referred to generally as "drawn-down" ratio. Ordinarily the draw-down ratio is in the range of about 5 to 1 to 100 to 1 and draw-down ratios in the range of about 20 to 1 to 60 to 1 are preferred.

Films can also be prepared using a chill roll rather than the quench bath although the quench bath method is preferred. Using the chill roll method the polymer is extruded through a slot die and cast in sheet on a temperature controlled roll having a highly polished surface. The drum revolves at a regulated speed to draw the extrudate down to the desired film thickness. The film thus produced has longitudinal orientation albeit the directional orientation is less than if film were produced with the same degree of drawn-down in the quench bath operation. For example, film having a thickness of about 0.4 mils can be made by extruding ethylene polymer at a temperature of about 480° F. on to a chill roll through which 54° F. water is circulated so that the roll surface is at a temperature of about 80 to 82° F. Production speeds as high as 250 feet per minute can be achieved by this method.

The films are formed into the laminate by bonding them together with a flexible adhesive. In this regard the specific adhesive is not particularly important so long as it is what is generally known as a flexible laminating adhesive. A number of suitable commercially available materials are known and used in the laminating art. Most common and preferred among the flexible adhesives are the elastomeric adhesives which are made from rubber or a rubber-like base. For example these adhesives can be made by dissolving in solvents such materials as natural rubber, chlorinated rubber, reclaimed rubber, cyclized rubber, rubber hydrochloride, polyisobutylene, butyl rubber, polyisoprene, polychloroprene, polybutadiene, the rubbery copolymers of butadiene with styrene or acrylonitrile, and the like. Ordinarily the solvents are liquid aliphatic hydrocarbons although aromatic hydrocarbons are sometimes preferred for chlorinated rubber. Various well known additives such as plasticizers, resins, peptizing agents or thinners, such as alcohol are sometimes used. While the solvent based elastomeric adhesives are preferred for bonding the non-polar surfaces of the olefin polymer films, water based adhesives can be used and perform very well if the surfaces of the plies to be bonded have been pretreated by flame or oxidizing agent to increase receptivity to adhesives. Examples of these water based adhesives are aqueous dispersions of natural rubber or synthetic rubber prepared by emulsion polymerization.

In the selection of adhesives those adhesives which produce strong, rigid bonds should be avoided. Of course adhesives which produce but a weak bond even though the bond is flexible will perform less satisfactorily than those which produce a strong but flexible bond. No difficulty will be experienced in the selection of suitable adhesives if it is kept in mind that the bond formed should be strong but, more important, it should be flexible.

At least two plies are used in building up the laminate but more plies can be used if desired. For most applications two plies will be sufficient, however, the benefits of my invention can be enjoyed with two-ply laminates as well as with those having more plies. The adhesive should be applied sparingly by hand or mechanically, using any method such as swabbing, brushing or spraying. The plies are then joined and pressed together, preferably between rollers so that good contact is made and blisters or wrinkles are eliminated. Ordinarily the amount of adhesive needed will be in the range of about 2 to 6 pounds adhesive per 3,000 square feet of film. Adhesive may be applied to only one or to both contacting surfaces of the plies to be joined.

Although the products of this invention show superior tear, impact and puncture strength compared to that which is expected of single plies of the polymer of the same thickness, this superiority is peculiar to the product prepared from films which are produced by the extrusion-quenching method such as by the water quench or chill roll methods described above. I have found that lamination does not greatly improve the impact strength of films produced by the blown tubing method. It is essential, therefore, that the films be produced by extrusion and immediate quenching with a takeup rate sufficient to produce longitudinal orientation within the film. Greatly improved tear resistance in the laminate is provided by bonding the plies in such a manner that the machine direction orientations of the two or more plies are not parallel but are rotated at least 10 degrees relative to each other. Preferably the plies are joined so that their lines of orientation intersect at an angle of at least 30 degrees. Maximum tear strength results when the adhesive used is neither extremely weak nor extremely strong, but the adhesive must be flexible. In addition to the increased tear strength the laminates are resistant to notching and scratching and strength is not reduced by relatively sharp creasing. This is very important in packing materials. These laminates have an increase in burst strength even with the directions of orientation placed at 90 degrees with respect to each other. This improvement in burst strength cannot be measured, however, by conventional laboratory techniques where the specimens are tightly clamped. When the laminates are formed into bags and drop tested, however, this improvement is evident and the results are far in excess of what would be expected. In the tests used to determine burst strength, bags of various sizes formed from the laminates were filled with commerciall pellets of polyethylene having a density of 0.960 and the bags were then butt dropped on a concrete floor. These samples were tested by dropping from greater and greater heights until a drop failure height was found. The bags which exhibited the best performance in the bag drop test were those made of laminates in which the plies were bonded together so that their directions of orientation were rotated between 45 and 90 degrees with respect to each other. Where the angle of rotation is less than 90 degrees, best results are obtained when the machine direction orientation of the laminate is substantially parallel to the width of the bag.

It is not necessary that all of the plies of the laminate be formed from the same polymer. The plies may be varied in order to obtain various combinations of properties. In general, however, it is desired that the plies in the laminate have substantially equivalent properties of tensile and elongation.

In order to illustrate my invention further the following examples are presented. In these examples the conditions and proportions are presented as being typical and should not be construed to limit my invention unduly.

EXAMPLE I

Polyethylene having a density of about 0.960 and a melt index of about 5.0 was formed into films two mils thick by extrusion and quenching on a chill roll with the roll speed being set to produce longitudinal orientation in the film thus produced. Two of these films were laminated by bonding with a flexible laminating adhesive to form a two ply structure and the laminate was formed into bags which were filled with 10 pounds of polyethylene pellets and tested by dropping from various heights onto a concrete floor. Similar bags were tested formed from the same film using a double thickness so that the bag wall had two plies but no adhesive bonding in plies together. The bags formed from the double plies without adhesive failed when dropped from a height of less than 8 feet whereas the laminates of the two plies bonded with the flexible laminating adhesive could be dropped from a height greater than 14 feet without rupture.

EXAMPLE II

Laminates formed from films produced as described in Example I were tested for tear resistance. In these laminates the machine direction of the films was substantially parallel. The Elmendorf tear of the unlaminated structure was 1.5 while the Elmendorf tear of the laminates made of the two plies bonded with flexible laminating adhesive was 18.

EXAMPLE III

Two ply laminates were made with and without a flexible laminating adhesive from ¾ mil plies of polyethylene film produced by extrusion of polyethylene having a density of about 0.960 and a melt index of about 5 and water quenching the extruded film with a takeup rate sufficient to produce longitudinal orientation in the film. Various laminates were prepared with the directions of orientation of the two plies substantially parallel and rotated 10, 30 and 90 degrees. These laminates were then tested for Elmendorf tear. The results are shown in Table I.

Table I

| Rotation of Orientation of Film Layers (degrees) | Elmendorf Tear | |
|---|---|---|
| | No Adhesive | Flexible Adhesive |
| 0 | 1 | 14 |
| 10 | 1 | 25 |
| 30 | 5 | 50 |
| 90 | 7 | 50 |

The above data show that while considerable improvement in tear resistance is obtained by rotating the directions of orientation of the plies making up the laminate this improvement is attained only when the plies are bonded together.

As will be apparent to those skilled in the art from the above disclosure, various modifications can be made in my invention without departing from the spirit or scope thereof.

I claim:

1. A laminated pellicular structure comprising at least two sheets of polymer film bonded together with a flexible elastomeric adhesive, said film having been formed from an olefin polymer having a crystallinity of at least 80 percent at 25 degrees centigrade and a density in the range of 0.940 to 0.980 by extruding and immediately quenching the film with a takeup rate sufficient to produce longitudinal orientation, said sheets being positioned in said structure with their directions of orientation rotated at 30 to 90 degrees with respect to each other.

2. A laminated pellicular structure comprising at least two sheets of polymer film, each having a thickness in the range of 0.25 to 30 mils bonded together with a flexible elastomeric adhesive, said film having been formed from ethylene polymer having a crystallinity of at least 80 percent at 25 degrees centigrade and a density in the range of 0.940 to 0.990 by extruding and immediately quenching the film with a takeup rate sufficient to produce longitudinal orientation, said sheets being positioned in said structure with their directions of orientation rotated 30 to 90 degrees with respect to each other.

3. The laminate of claim 2 containing from 2 to 6 pounds of adhesive per 3,000 square feet.

4. A bag formed from the laminate of claim 2.

5. A bag formed from a laminate comprising two sheets of film having a thickness of about 0.5 to 5 mils and bonded together with a flexible elastomeric adhesive, said film having been formed by extrusion and water quenching polyethylene having a crystallinity of at least 80 percent at 25 degrees centigrade and a density of about 0.960 with a takeup rate sufficient to produce longitudinal orientation, said sheets being positioned in the laminate with their directions of orientation being rotated between 45 and 90 degrees wth respect to each other and the direction of orientation of at least one of said sheets being positioned in the bag parallel to the width of said bag.

References Cited by the Examiner

UNITED STATES PATENTS

| | | | |
|---|---|---|---|
| 2,537,666 | 6/1951 | Gowing | 156—306 XR |
| 2,586,820 | 2/1952 | Hemperly et al. | |
| 2,664,378 | 12/1953 | Heller | 156—333 |
| 2,675,339 | 4/1954 | Zenftman. | |
| 2,956,723 | 10/1960 | Tritsch | 229—48 |

EARL M. BERGERT, *Primary Examiner.*